(12) United States Patent
Choi et al.

(10) Patent No.: US 11,461,340 B2
(45) Date of Patent: Oct. 4, 2022

(54) ADAPTIVE SEARCH USING SOCIAL GRAPH INFORMATION

(71) Applicant: Sony Interactive Entertainment LLC, San Mateo, CA (US)

(72) Inventors: Christopher Choi, Sunnyvale, CA (US); Daniel Morales, San Francisco, CA (US); Brinton Williams, San Mateo, CA (US); Christopher DePizzol, Alameda, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 195 days.

(21) Appl. No.: 15/872,871

(22) Filed: Jan. 16, 2018

(65) Prior Publication Data
US 2019/0220523 A1 Jul. 18, 2019

(51) Int. Cl.
*G06F 7/00* (2006.01)
*G06F 16/00* (2019.01)
(Continued)

(52) U.S. Cl.
CPC ...... *G06F 16/24578* (2019.01); *G06F 16/337* (2019.01); *G06F 16/3326* (2019.01); *G06F 16/3334* (2019.01); *G06F 16/951* (2019.01); *G06F 16/9536* (2019.01); *G06Q 30/0625* (2013.01)

(58) Field of Classification Search
None
See application file for complete search history.

(56) References Cited

U.S. PATENT DOCUMENTS

2004/0039988 A1 2/2004 Lee et al.
2005/0256846 A1 11/2005 Zigmond et al.
(Continued)

FOREIGN PATENT DOCUMENTS

CN 112204539 A 1/2021
EP 3740877 11/2020
(Continued)

OTHER PUBLICATIONS

PCT Application No. PCT/US2018/068223 International Search Report and Written Opinion dated Apr. 15, 2019.
(Continued)

*Primary Examiner* — Tuan A Pham
(74) *Attorney, Agent, or Firm* — Polsinelli LLP (57) ABSTRACT

The subject disclosure relates systems and methods for returning accurate and relevant search results in an online platform. In some aspects, a process of the disclosed technology can include steps for displaying a first set of search results, the first set of search results including a first plurality of media content items arranged in an order of descending relevance based on search frequency, receiving a first character input from a user of a user device, the first character input defining a first character in a search query, and updating the first set of search results to a second set of search results based on the first character input, the second set of search results comprising at least one media content item not included in the first set of search results that is available for consumption by the user. Systems and machine-readable media are also provided.

22 Claims, 8 Drawing Sheets

(51) Int. Cl.
*G06F 16/2457* (2019.01)
*G06Q 30/06* (2012.01)
*G06F 16/335* (2019.01)
*G06F 16/951* (2019.01)
*G06F 16/332* (2019.01)
*G06F 16/33* (2019.01)
*G06F 16/9536* (2019.01)

(56) References Cited

U.S. PATENT DOCUMENTS

| | | | |
|---|---|---|---|
| 2008/0249786 A1* | 10/2008 | Oldham | G06F 16/951 705/1.1 |
| 2009/0043738 A1* | 2/2009 | James | G06F 16/24578 |
| 2009/0083232 A1* | 3/2009 | Ives | G06F 16/3322 |
| 2010/0293474 A1 | 11/2010 | York et al. | |
| 2013/0036109 A1* | 2/2013 | Kulick | G06Q 10/10 707/722 |
| 2013/0097158 A1* | 4/2013 | Pobbathi | G06F 16/9535 707/723 |
| 2013/0191416 A1* | 7/2013 | Lee | G06F 16/2457 707/771 |
| 2013/0232128 A1 | 9/2013 | Krishnan et al. | |
| 2014/0025671 A1* | 1/2014 | Marlow | G06F 16/24575 707/727 |
| 2014/0280093 A1 | 9/2014 | Marantz et al. | |
| 2016/0063065 A1* | 3/2016 | Khatri | G06Q 30/02 707/723 |
| 2016/0098493 A1* | 4/2016 | Primke | H04L 65/403 707/754 |
| 2016/0173540 A1* | 6/2016 | Linden | H04L 65/1083 705/26.8 |
| 2017/0004143 A1 | 1/2017 | Ryan | |
| 2017/0206250 A1 | 7/2017 | Loomans | |

FOREIGN PATENT DOCUMENTS

| | | |
|---|---|---|
| JP | 2021-512397 | 5/2021 |
| WO | WO 2019/143466 | 7/2019 |

OTHER PUBLICATIONS

PCT Application No. PCT/US2018/068223 International Preliminary Report on Patentability dated Jul. 21, 2020.
PCT/US18/68223, Adaptive Search Using Social Graph Information, Dec. 31, 2018.
European Application No. 18901207.3, Extended European Search Report dated Sep. 30, 2021.

* cited by examiner

# ADAPTIVE SEARCH USING SOCIAL GRAPH INFORMATION

BACKGROUND

1. Technical Field

Aspects of the subject technology relate to ways to return search results based on a search query and in particular, for returning and organizing content items returned in a search based on contextual information.

2. Introduction

Rapid growth of the Internet and the consequential proliferation of online gaming systems have resulted in significant changes in the number and type of collaborative activities with which online users engage. In addition to online games, vendors provide music, movies, social networking streams and other media for consumption via specialized applications (e.g., "apps") executed on a personal computing platform, such as a console system, personal computer, smartphone, and/or tablet device, etc. Content items on offer to online users are typically searchable using an online store that provides content item search functionality.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the disclosed technology and is not intended to represent the only configurations in which the technology can be practiced. The appended drawings are incorporated herein and constitute a part of the detailed description. The detailed description includes specific details for the purpose of providing a more thorough understanding of the technology. However, it will be clear and apparent that the technology is not limited to the specific details set forth herein and may be practiced without these details. In some instances, structures and components are shown in block diagram form in order to avoid obscuring the concepts of the subject technology.

An increasing number of online transactions are performed for downloadable content items, such as movies, music, software, and video games. Such transactions routinely involve the search, selection, purchase and download of a content item, for example, from an online store or e-commerce portal. For gaming networks, content items, such as games, movies and/or music can be searched, selected, and downloaded via user interaction with an online store using a processor-based device, such as a game console, smartphone, personal computer, tablet computer, or the like. These computing devices (e.g., user devices) often provide search input and selection options through the display of an on-screen keyboard (OSK), and an associated list of search results that enumerate available (downloadable) content items.

Because of the many challenges in processing user search queries, there is a need in the art to provide search systems and intuitive displays that improve accuracy, relevancy, and ease of use. Aspects of the disclosed technology address this need by providing systems, methods and computer-readable media that provide solutions for improving search accuracy and display relevance based on content item popularity and social graph information.

As discussed in further detail below, aspects of the technology provide adaptive search results that are displayed concurrent to the receipt of user inputs relating to a search query. In some aspects, search results retuned in response to a search query can be organized in an order of descending relevance based on popularity, such as a number of purchases or downloads across various user segments in an online store. In other aspects, social graph information of a searching user may be used to provide improved relevance and ranking, for example, by prioritizing items that have been heavily engaged by online friends or social acquaintances of the user.

Figure 1:
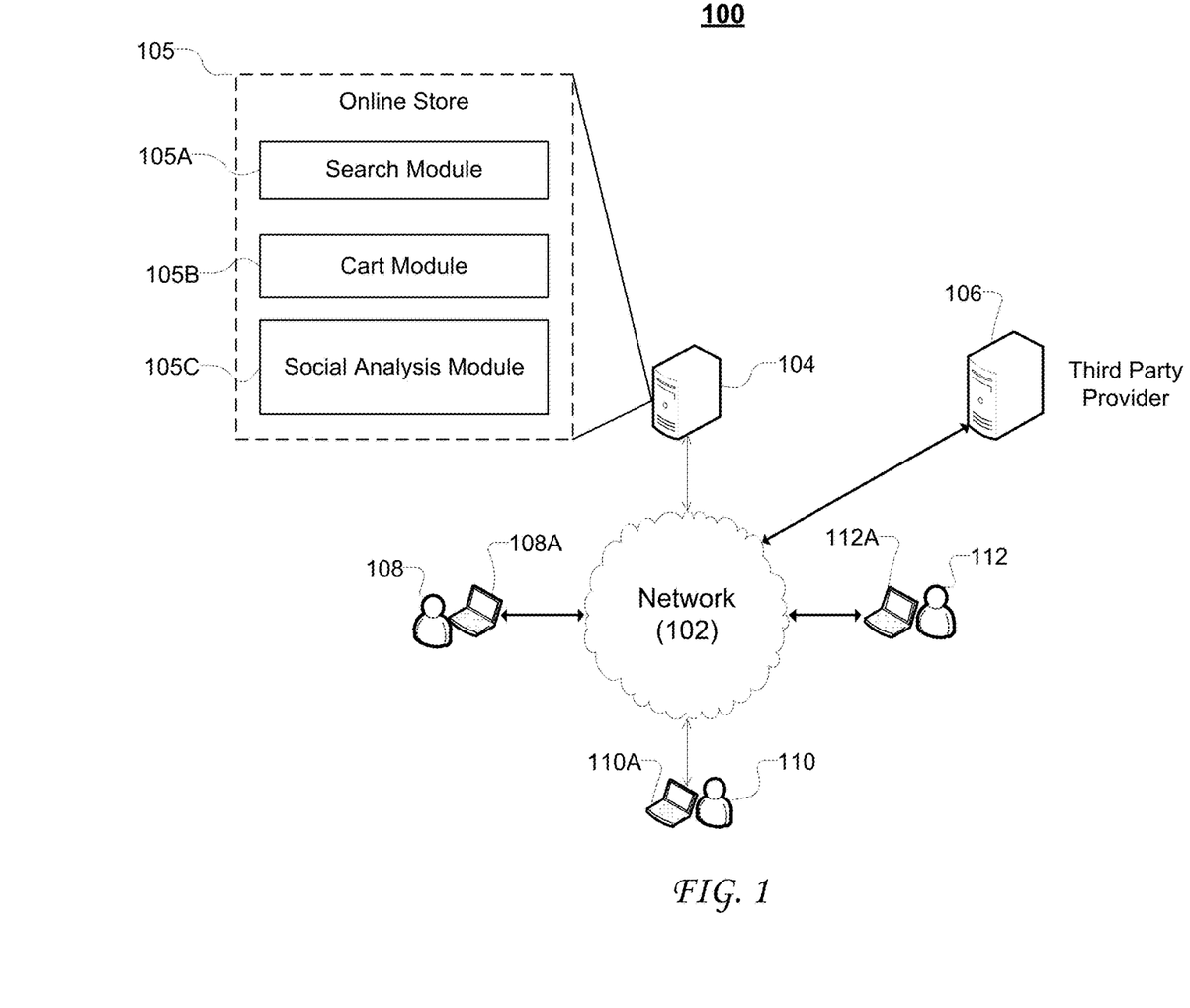
FIG. 1 illustrates an example environment in which some aspects of the technology can be implemented.

FIG. 1 illustrates an example environment 100 in which an online store can be used to receive a search query, perform a search, and to rank and return a number of content items as search results. Environment 100 includes network 102, that permits communication between a media-delivery system 104, a third-party provider 106, and users 108, 110, and 112, e.g., via respective computing devices 108A, 110A, and 112A. Store 105 contains a search module 105A, a cart module 105B, and a social analysis module 105C that provide the functionality, including displays and user selectable options, necessary to process a search query, and rand/display search results, according to some aspects of the technology.

It is understood that the architecture of environment 100 is intended to conceptually illustrate various functional components that can be used to implement an online shopping environment with search functionality. However, a greater or fewer number of hardware and/or software components may be deployed. For example, media-delivery system 104 could include multiple computing devices (e.g., servers), as part of a network (e.g., an online gaming network), or as part of a distributed computing system, such as a cloud data-center.

Users/players 108, 110, and 112, are intended to help illustrate aspects of the technology that relate to a multi-user, multi-player environment, as well as various other social networking aspects. However, a greater number of users or players may be included, without departing from the scope of the technology. Additionally, online store 105 is intended to conceptually illustrate various systems and software components (modules) that could be used to implement various aspects of an online search. However, such implementations could be performed using additional systems or software, such as one or more databases, search modules or content item repositories.

Media-delivery system 104 can be configured to facilitate the search, selection, purchase and delivery of various media content items, such as video games, movies, music, TV shows, or applications ("apps"), etc. In some aspects, content items are provided to media-delivery system by a third-party 106, such as a game-developer or studio, etc. Content items made available by media-delivery system 104 can be provided to any customer, user, or player, with access to media-delivery system 104, such as via a game-console system, personal computer, and/or portable device, such as a tablet computer or smartphone device, etc.

Typically, a user search for a content item must be successfully processed before selection and purchase of the item can be completed. User inputted search queries for one or more content items can be processed by online store 105 using several modules, including search module 105A, cart module 105B, and social analysis module 105C.

Search module 105A can provide the logic and user interfaces necessary to receive a search query, and to identify and rank search results that are displayed to a user. Search module 105A can also provide processing and logic necessary to make potential search query recommendations to a user, such as, by recommending search terms relating to product names, content item genres, and/or product names, and the like. In some aspects, search module 105A functions in conjunction with social analysis module 105C to provide item information that is based social affiliations of a user/customer. By way of example, search module 105A may utilize social analysis module 105C to provide metadata tags or other indications that are based on a purchase history of online connections or relations of the searching user. As discussed in further detail below, acting in conjunction with social analysis module 105C, search module 105A may provide content item recommendations that are based on a variety of factors, including information about how many relations of the user have purchased or engaged with a particular content item.

Figure 2:
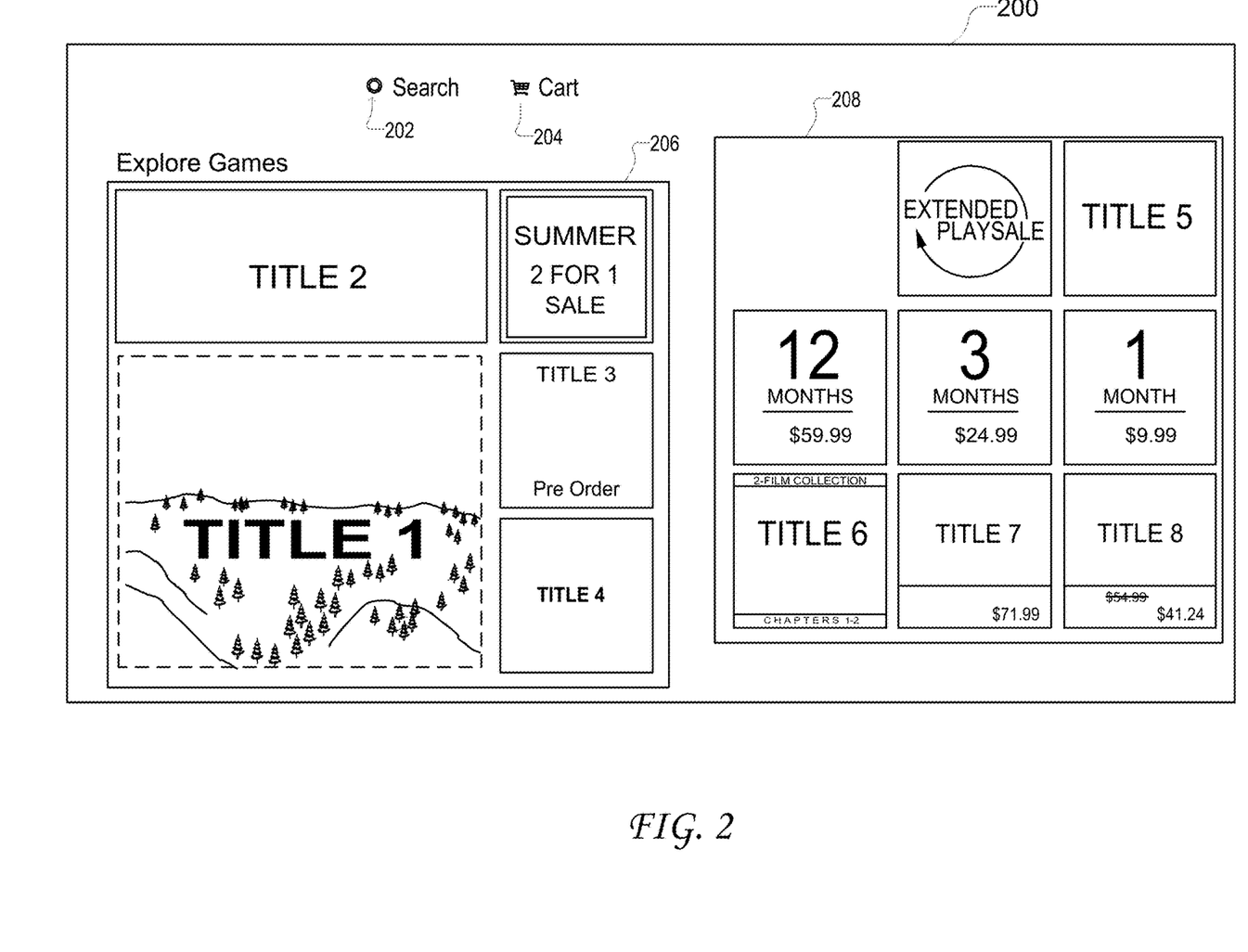
FIG. 2 illustrates an example display for an online store through which a content item search can be initiated by a user, according to some aspects of the invention.

FIG. 2 illustrates an example graphical display 200 of an online store that provides selectable user options to facilitate the purchase of content items. Purchasable content items can include any type of downloadable media content, such as movies, music, games, and/or software (such as apps), etc. Graphical display 200 is displayed by a user device associated with a user or customer of the online store. For example, graphical display 200 can be provided for display by a game console system, personal computer (PC), smartphone, tablet computer, or other mobile device associated with the user.

Graphical display 200 includes selectable icons that provide various user-selectable options relating to the search and selection of content items, e.g., for rent or for purchase. In the illustrated example, graphical display 200 includes a call to action (CTA) search icon 202, cart icon 204, and item-explorer displays 206, 208. Search icon 202 provides a selectable option to initiate a product search. For example, search icon 202 can be selected by a user, via a user-device (e.g., a console game system), to initiate a search for various content items, such as video games or movies, etc. Cart icon 204 can provide a selectable user option to facilitate access to an online shopping cart, for example, that displays items the user previously selected to purchase. In some aspects, the shopping cart accessible via cart icon 204 can be a persistent shopping cart configured to retain items selected in previous browsing sessions.

Item-explorer displays 206, 208 provide graphical displays of various content items and purchase options available within the online store. In the illustrated example, item-explorer display 206 indicates multiple titles available for rent, subscription and/or purchase. For example, item-explorer display 206 contains Title 1, Title 2, Title 3, and Title 4 representing media content items available for streaming or download, such as video games, movies, television series, etc. Item-explorer display 206 can also indicate options to display promotions available through the online store, such as, an icon providing access to "2 for 1" sale items on promotion during an indicated time-period, such as a season (summer). Similarly, item-explorer display 308 provides icons that indicating various offers for different content items.

Item-explorer display 208 provides icons provides icons to facilitate access to content items that are part of an "extended play sale" or for content item rent options, e.g., for different time periods, such as, 12 months, 3 months, or 1 month. Icons representing content item titles can also provide price information, indications of recent price changes, and/or sale information for content item bundles (e.g., a "2-film collection"). It is understood that item-explorer displays 206, 208 could provide virtually any type of information relating to the sale or promotion of content items or content bundles, without departing from the scope of the invention. In some aspects, a user can make a selection of one or more content items displayed in item-explorer displays 206, 208, for example, to add the selected title to an online shopping cart. In the illustrated example, Title 1, is selected, e.g., by a user associated with a client device.

Additionally, the user may search other content items in the store for addition to cart 204, for example, by navigating to a search menu provided in response to user selection of search icon 202. Graphical features relating to the beginning of an example search process are detailed with respect of FIG. 3A.

Figure 3A:
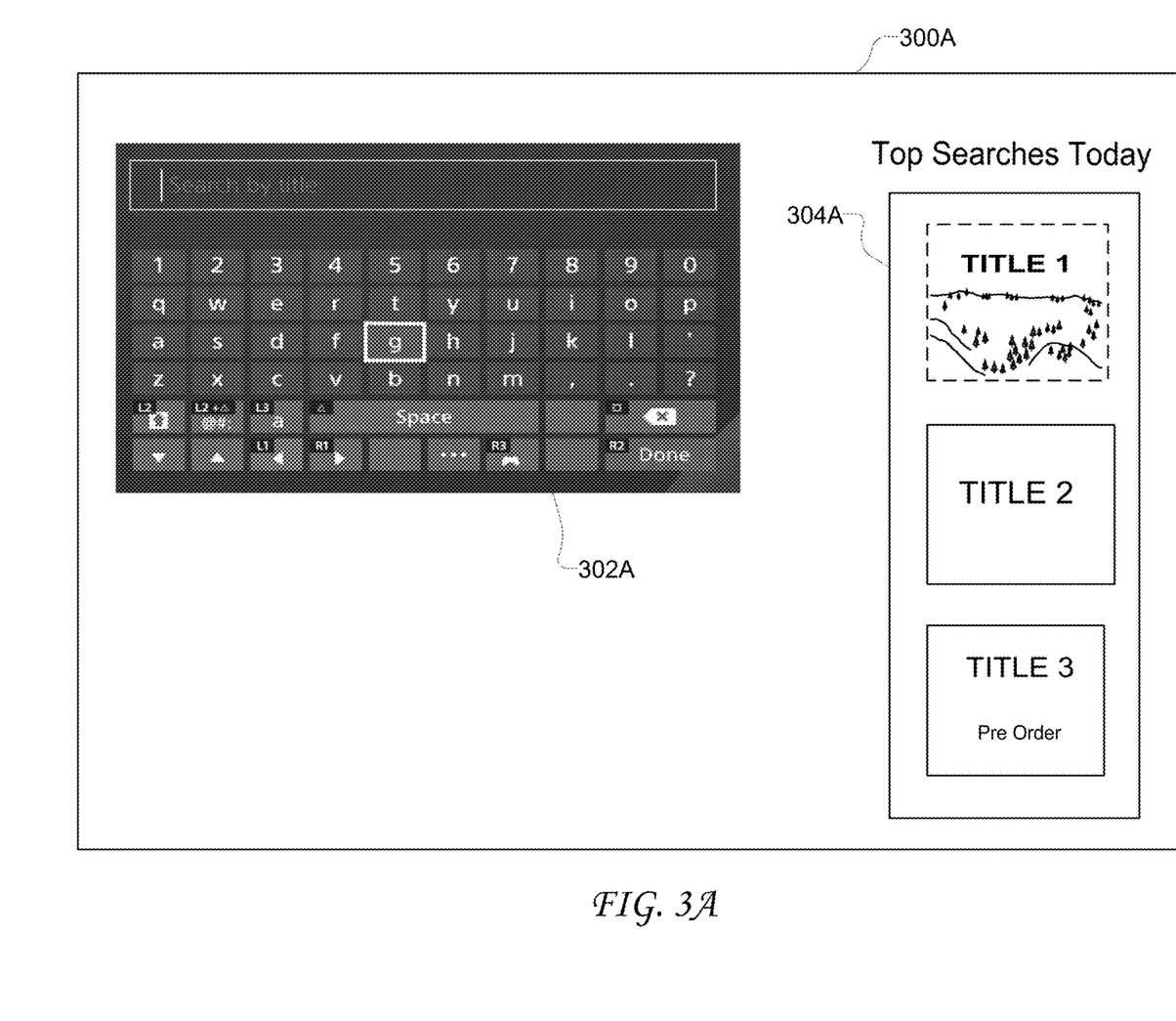
FIGS. 3A-3B illustrate graphical displays that can be provided to a user during the entry of a search query, including metadata tags providing additional information for adjacently displayed items, according to some aspects of the technology.

FIG. 3A illustrates an example graphical display 300A that is provided at the beginning of a content item search. Display 300A includes an on-screen interface 302A that provides an on-screen keyboard and a search query input box. In the illustrated display example, on-screen interface 302A includes a CTA "Search by Title" displayed in the query input box. It is understood that on-screen interface 302A could provide different character input options and/or different CTAs, without departing from the scope of the technology.

Display 300A also provides a default (first) set of search results 304A indicated by a heading "Top Searches Today." The first set of search results 304A in this example represents a list of most frequently searched content items in the past 24 hrs, arranged in descending order by search frequency. That is, Title 1 is associated with a highest search frequency among online store users, whereas Title 3 is associated with a lowest relative search frequency among the displayed items. It is understood that the first set of search results 304A can include a greater (or fewer) number of items. Additionally, frequency counts for displayed items may be differently computed, depending on the desired implementation.

By way of example, the first set of search results 304A may indicate a list of the most frequently searched and/or purchased content items over other durations, such as the past year, month, or week. In some aspects, the most frequently searched items may be a global popularity calculated over all available time of the associated item. As discussed in further detail below, the search results may also be arranged in an order that is based on social graph information, such as, based on a purchase or play frequency by online acquaintances of the searching user.

Additionally, the arrangement of graphical display 300A, as well as the transitions and animations when entering/leaving display 300A may be different. For example, the OSK and/or the first set of search results 304A may be provided in other regions of the display area provided by display 300A. Additionally, when the first set of search results 304A are being loaded, the loading process may be animated with a slight wireframe to indicate that the items are about to be displayed.

Figure 3B:
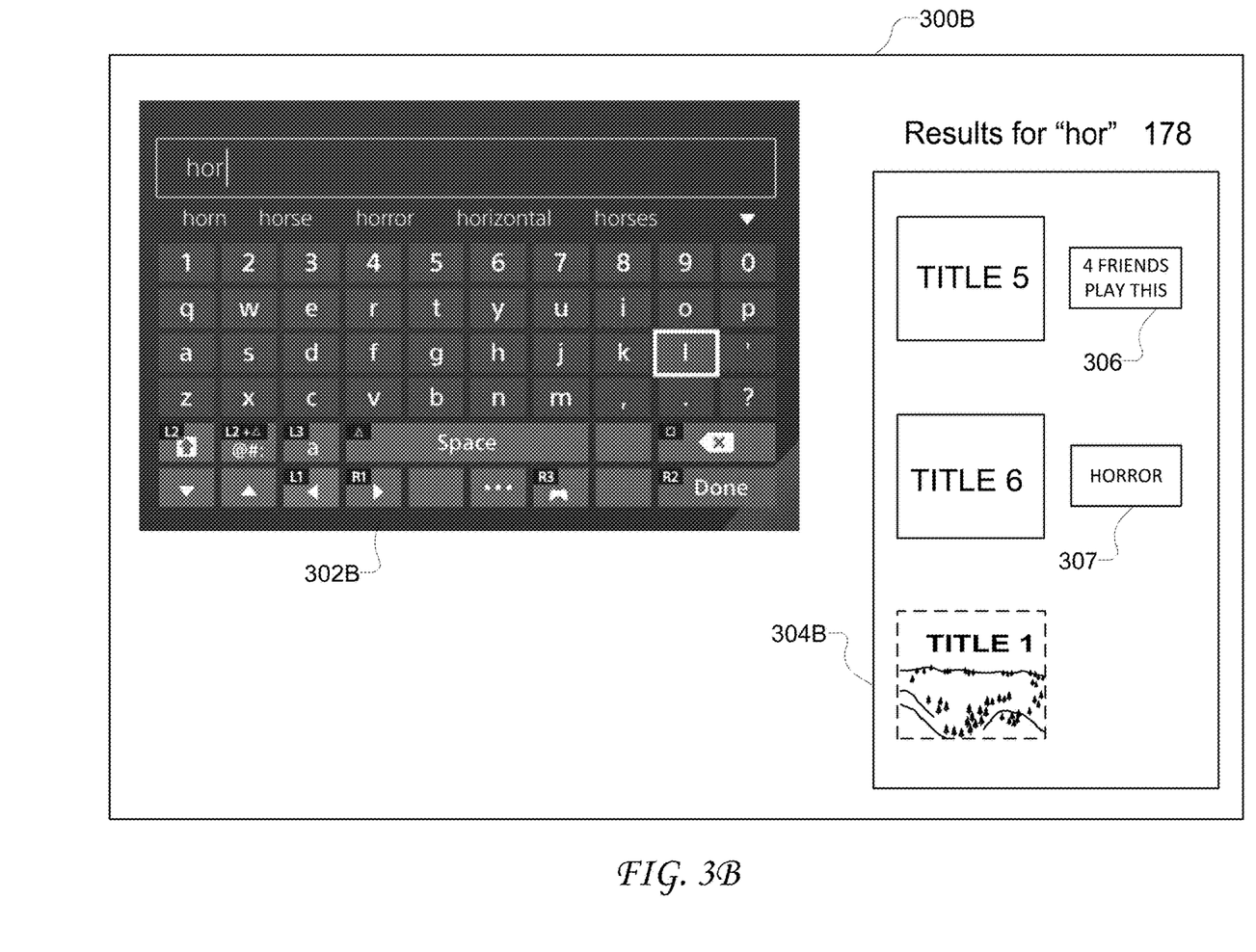

FIG. 3B illustrates an example of a graphical display 300B provided after one or more character inputs have been received from a user device, according to some aspects of the technology. In the illustrated example, a second set of search results 304B are displayed in response to user entry of the characters "hor" provided to on-screen interface 302B. In this example, search results 304B includes an indication of a number of results returned in response to the search query, i.e., 178.

The content items displayed among search results 304B can be updated after entry of each subsequent character by a user inputting a search query. In some embodiments, the results can be based on a measure of relevance with respect to the characters/search query entered, and can be arranged based on social graph information. For example, if Title 5 and Title 6 are both determined to be highly relevant with respect to the partial (or fully) entered search query, the items may be ranked based on social graph information e.g., based on a frequency of engagement with the item by one or more online friends or acquaintances of the user. In the illustrated example, Title 5 may be ranked higher than Title 6 in search results 304B if Title 5 had a greater amount of engagement by members of the user's social network.

In response to character entries received as part of a search query, on-screen interface 302B can also provide a display of suggested search terms that are available for user selection. Further to the example of FIG. 3B, the terms "horn," "horse," "horror," "horizontal," and "horses," are provided as suggested search terms. User engagement with any suggested search term and replace the search query with that term. For example, user selection of "horse" in on-screen interface 302B can supply the entire string as a submitted search query.

In some aspects, metadata tags can be displayed adjacent to one or more content items returned in the search results, for example, to provide additional information with respect to the associated item. In the example illustrated by FIG. 3B, search results 304B returned in response to entry of the characters "hor" include Title 5, Title, 6 and Title 1 (ranked respectively). Title 5 is displayed adjacent to metadata tag 306, which indicates social graph information with respect to the item, i.e., that four of the user's friends play the Title 5 content item. Title 6 is displayed adjacent to metadata tag 307, which indicates a genre (e.g., "Horror") with respect to the Title 6 content item. It is understood that a greater (or fewer) number of metadata tags could be used to augment one or more content items returned in search results 304B. Additionally, the metadata information may be used to perform different relevance rankings, depending on the desired implementation. For example, highly relevant genres may be deemed to be more relevant in a listing of search results as compared to social relevance information. In such instances, Title 6 may be ranked higher than Title 5 in search results 304B.

Selection of a content item provided in search results 304B, can cause the display of product information for the selected content item. Animated transitions between the display of search results 304B, and the selected content item may be implemented. For example, a background color of graphical display 300B can be transitioned based on the color motif of the selected title.

Figure 3C:
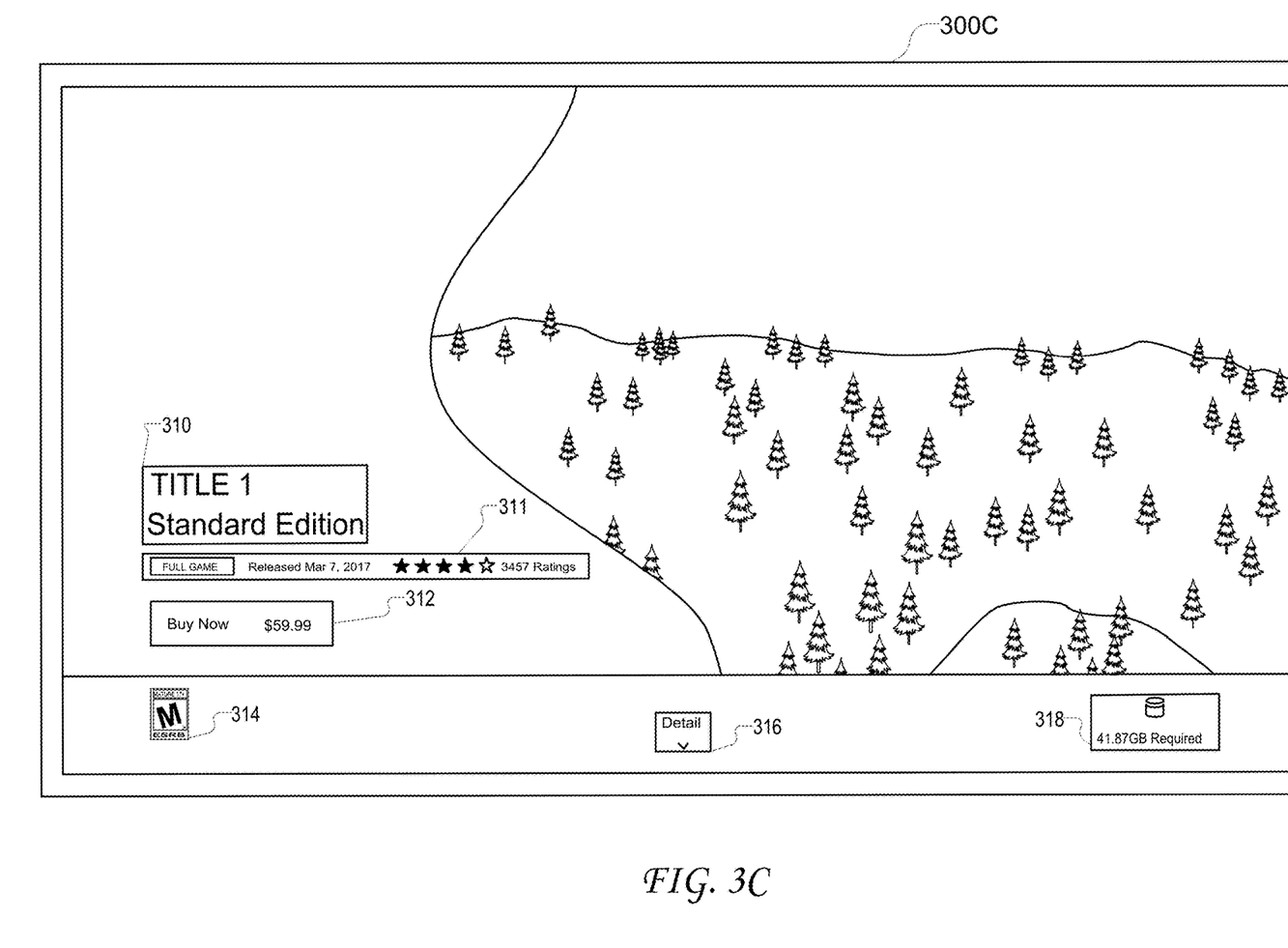
FIG. 3C illustrates an example display provided in response to a user selection of a content item returned in a search, according to some aspects of the technology.

FIG. 3C illustrates an example display that is provided after selection of Title 1 in graphical display 300B. That is, FIG. 3C illustrates graphical display 300C, that provides additional information regarding the selected content item, i.e., Title 1. Graphical display 300C includes various information items, such as, information displays 310, 311, 312, 314, 316, and 318 that provide additional information with respect to the selected content item (Title 1). Information display 310 provides an indication of the title (e.g., "Title 1"), as well as a version associated with the selected item e.g., "standard edition." Information display 311 indicates the sales offer (e.g., "full game"), release date information (e.g., Mar. 7, 2017), and a user rating. Information display 312 indicates a price option (e.g., "$59.99") should the user wish to continue with purchase and "Buy Now." Information displays 314, 316, and 318, can provide additional information including a maturity rating, a selectable option for further detail expansions, and an indication of space required for the content-item download of Title 1, respectively. It is understood that different information displays may be used to indicate other aspects or characteristics of a selected content item, without departing from the scope of the invention.

Figure 4:
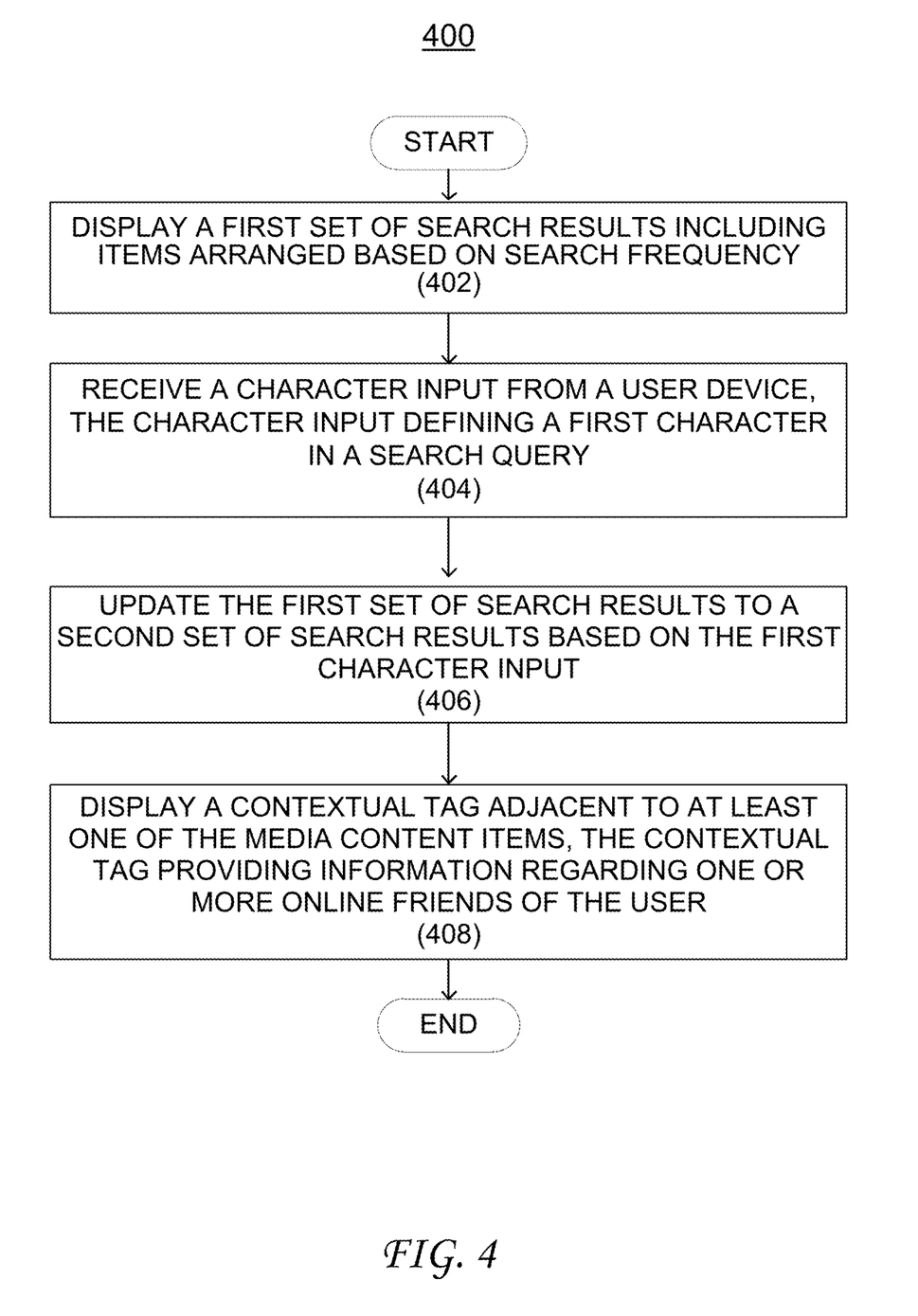
FIG. 4 illustrates an example process that can be used to carry out a search, according to some aspects of the technology.

FIG. 4 illustrates an example process 400 for implementing a content item search, according to some aspects of the technology. Process 400 begins with step 402 in which a first set of (default) search results are displayed. The first set of default search results can include a variety of content items available for search and/or purchase in an online platform, such as online store 105 discussed above with respect to FIG. 1. As discussed above, the first set of search results can include a listing of most frequently searched or downloaded items with respect to a given time period.

Providing an initial indication of the most frequently searched items can enable the user to conveniently find a desired item without the need to input a search query. Additionally, by providing an indication of the most frequent search results, the user can be informed as to current trends in content item consumption across the platform. In step 404, one or more character inputs are received from a user device, for example, defining at least a portion of a search query to be entered.

In step 406, the displayed search results are updated concurrently with each additional character input received from the user. That is, the first set of search results are updated to a second set of search results based on a partial (or full) search query entry. The second set of search results display one or more content items in a list of descending relevance, which may be determined based on any number of factors, including but not limited to: genre, social graph information, purchase frequency associated with an item, and/or a purchase history for the searching user.

In step 408, a contextual tag is displayed adjacent to at least one of the media content items. The contextual tag can provide additional information to the user regarding the associated content item, such as, genre information and/or social relevance information. Further to the example provided above with respect to FIG. 3B, contextual (metadata) tags can be used to provide indications that a user's friends have purchased or "liked" a particular content item. In this manner, contextual tags may be useful not only in ranking search results based on relevance, but in providing useful information that the user may consider when making selection and purchase decisions.

Figure 5:
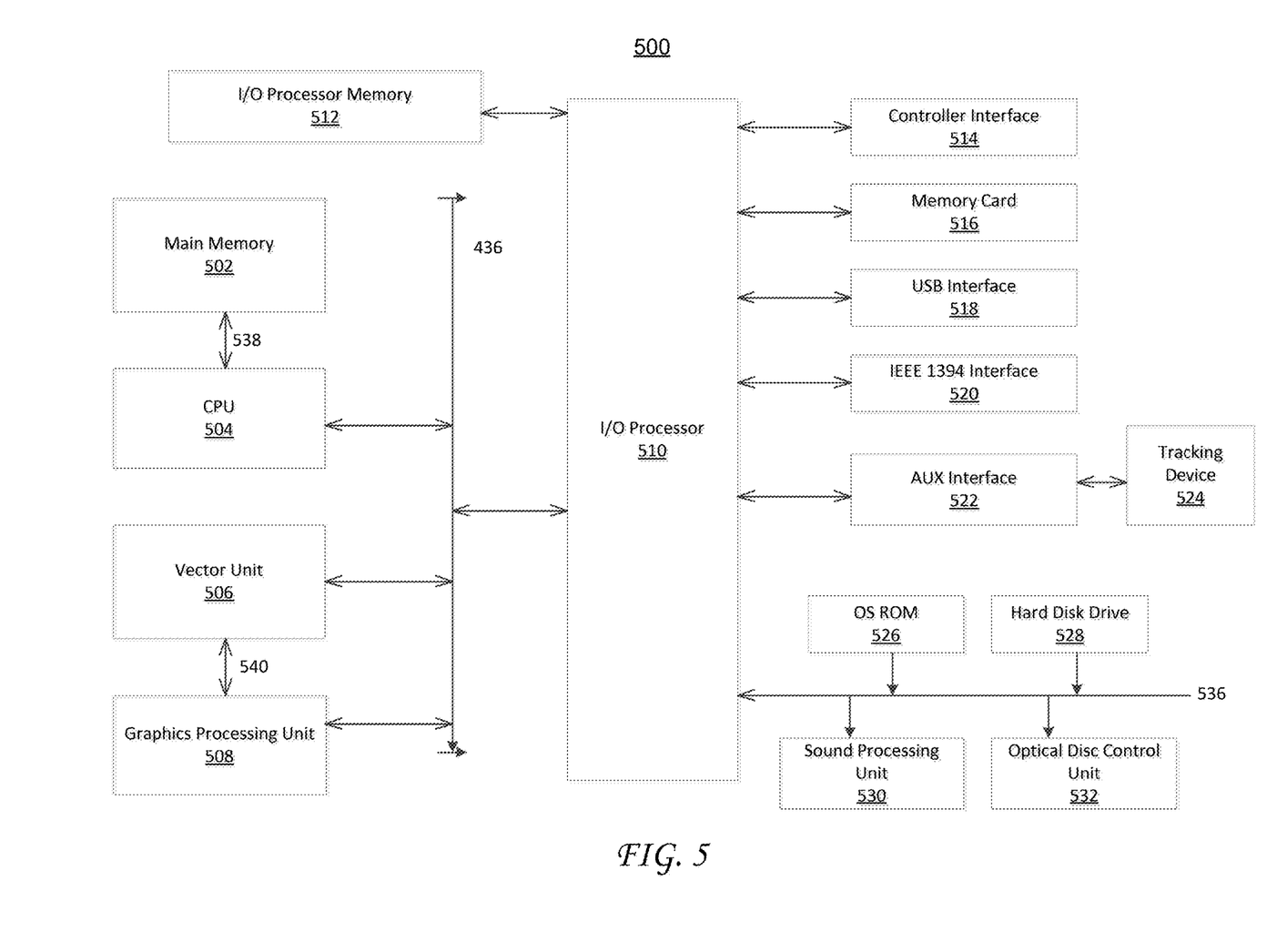
FIG. 5 illustrates an example of hardware components used to implement a user device, such as a game console system, that can used to implement some aspects of the disclosed technology.

FIG. 5 illustrates an example of an electronic system with which some aspects of the subject technology can be implemented. In particular, FIG. 5 is an exemplary user device 500, such as a game console system, that the user can use to browse an online store to purchase and download various content items.

User device 500 can include various elements as illustrated in FIG. 4. It should be noted that the elements are exemplary and that other embodiments may incorporate more or less than the elements illustrated. With reference to FIG. 4, user device 500 includes a main memory 502, central processing unit (CPU) 504, at least one vector unit 506, graphics processing unit 508, input/output (I/O) processor 510, I/O processor memory 512, controller interface 514, memory card 516, Universal Serial Bus (USB) interface 518, IEEE 1394 interface 520, and an auxiliary (AUX) interface 522 for connecting a tracking device 524, although other bus standards and interfaces may be utilized. User device 500 further includes an operating system read-only memory (OS ROM) 526, a sound processing unit 528, an optical disc control unit 530, and a hard disc drive 532, which are connected via a bus 534 to the I/O processor 510. The user device 500 further includes at least one tracking device 524.

Tracking device 524 can be a camera, which includes eye-tracking capabilities. The camera may be integrated into or attached as a peripheral device to user device 500. In some eye-tracking device implementations, infrared non-collimated light is reflected from the eye and sensed by a camera or optical sensor. The information is then analyzed to extract eye rotation from changes in reflections. Camera-based trackers focus on one or both eyes and record their movement as the viewer looks at some type of stimulus. Camera-based eye trackers use the center of the pupil and light to create corneal reflections (CRs). The vector between the pupil center and the CR can be used to compute the point of regard on surface or the gaze direction. A simple calibration procedure of the viewer is usually needed before using the eye tracker.

Alternatively, more sensitive trackers use reflections from the front of the cornea and that back of the lens of the eye as features to track over time. Even more sensitive trackers image features from inside the eye, including retinal blood vessels, and follow these features as the eye rotates. Most eye tracking devices use a sampling rate of at least 30 Hz, although 50/60 Hz is most common. Some tracking devises run as high as 1250 Hz, which is needed to capture detail of very rapid eye movement.

A range camera may instead be used with the present invention to capture gestures made by the user and is capable of facial recognition. A range camera is typically used to capture and interpret specific gestures, which allows a hands-free control of an entertainment system. This technology may use an infrared projector, a camera, a depth sensor, and a microchip to track the movement of objects and individuals in three dimensions. This user device may also employ a variant of image-based three-dimensional reconstruction.

The tracking device 524 may include a microphone integrated into or attached as a peripheral device to user device 500 that captures voice data. The microphone may conduct acoustic source localization and/or ambient noise suppression.

Alternatively, tracking device 524 may be the controller of the user device 500. The controller may use a combination of built-in accelerometers and infrared detection to sense its position in 3D space when pointed at the LEDs in a sensor nearby, attached to, or integrated into the console of the entertainment system. This design allows users to control functionalities of the user device 500 with physical gestures as well as button-presses. The controller connects to the user device 500 using wireless technology that allows data exchange over short distances (e.g., 30 feet). The controller may additionally include a "rumble" feature (i.e., a shaking of the controller during certain points in the game) and/or an internal speaker.

The controller may additionally or alternatively be designed to capture biometric readings using sensors in the remote to record data including, for example, skin moisture, heart rhythm, and muscle movement.

As noted above, the user device 500 may be an electronic gaming console. Alternatively, the user device 500 may be implemented as a general-purpose computer, a set-top box, or a hand-held gaming device. Further, similar user devices may contain more or less operating components.

CPU 504, vector unit 506, graphics processing unit 508, and I/O processor 510 communicate via system bus 536. Further, the CPU 504 communicates with the main memory 502 via a dedicated bus 538, while the vector unit 506 and the graphics processing unit 508 may communicate through a dedicated bus 540. The CPU 504 executes programs stored in the OS ROM 526 and the main memory 502. The main memory 502 may contain pre-stored programs and programs transferred through the I/O Processor 510 from a CD-ROM, DVD-ROM, or other optical disc (not shown) using the optical disc control unit 532. The I/O processor 510 primarily controls data exchanges between the various devices of the user device 500 including the CPU 504, the vector unit 506, the graphics processing unit 508, and the controller interface 514.

Graphics processing unit 508 executes graphics instructions received from the CPU 504 and the vector unit 506 to produce images for display on a display device (not shown). For example, the vector unit 506 may transform objects from three-dimensional coordinates to two-dimensional coordinates, and send the two-dimensional coordinates to the graphics processing unit 508. Furthermore, the sound processing unit 530 executes instructions to produce sound signals that are outputted to an audio device such as speakers (not shown).

A user of user device 500 provides instructions via controller interface 514 to CPU 504. For example, the user may instruct CPU 504 to store certain information on the memory card 516 or instruct user device 500 to perform some specified action.

Other devices may be connected to user device 500 via USB interface 518, IEEE 1394 interface 520, and AUX interface 522. Specifically, tracking device 524, including a camera or a sensor may be connected to user device 500 via AUX interface 522, while a controller may be connected via USB interface 518.

Figure 6:
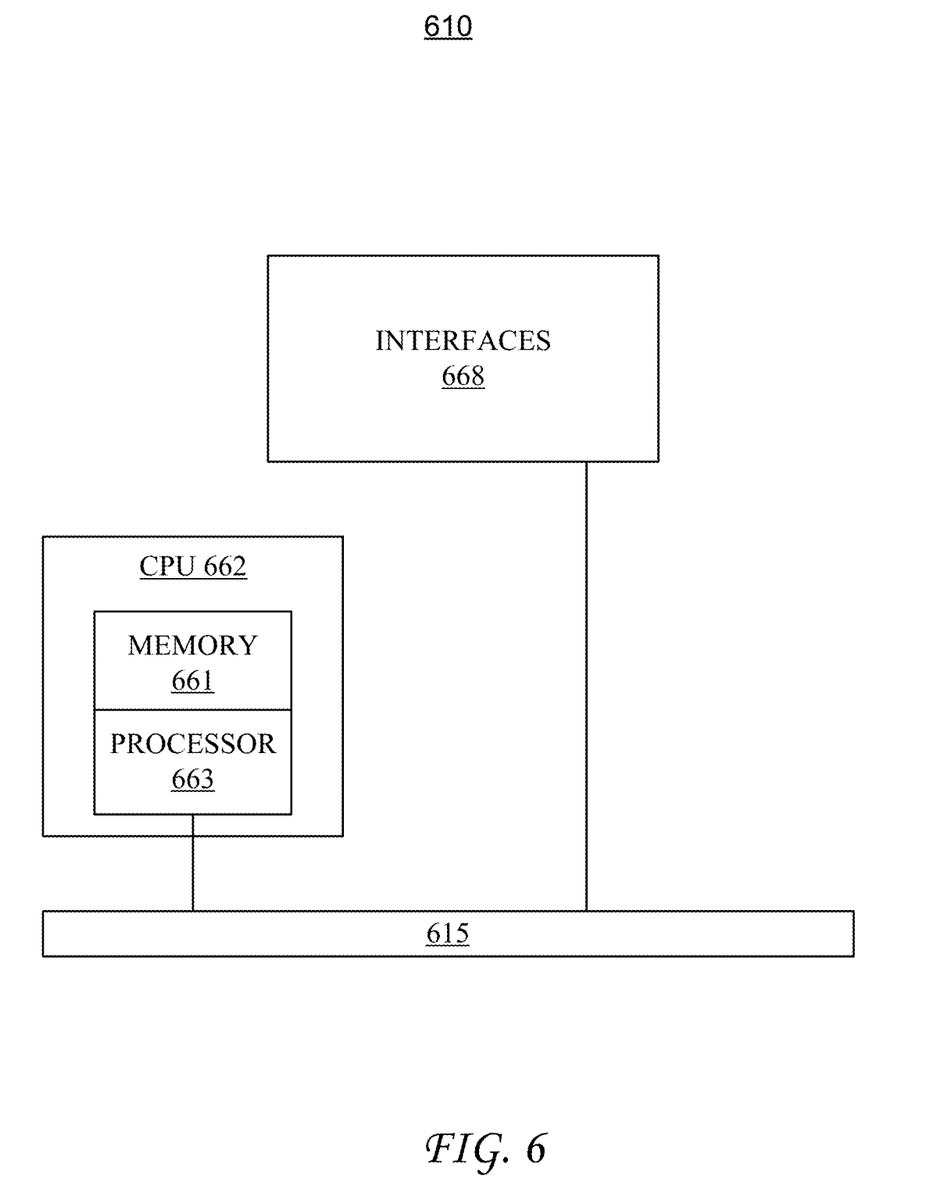
FIG. 6 illustrates an example of a network device that can be used to implement some aspects of the technology.

FIG. 6 illustrates an example network device 610 according to some embodiments. Network device 610 can be used to implement one or more servers or remote computing devices, such as media delivery system 104, discussed above with respect to FIG. 1. Network device 610 includes a master central processing unit (CPU) 662, interfaces 668, and a bus 615 (e.g., a PCI bus).

When acting under the control of appropriate software or firmware, CPU 662 is responsible for executing functions necessary for operation of an online content delivery platform. CPU 662 preferably accomplishes all these functions under the control of software including an operating system and any appropriate applications modules, such as cart 105A, product recommendation module 105B, and/or social analysis module 105C, discussed above. CPU 662 may include one or more processors 663 such as a processor from the Motorola family of microprocessors or the MIPS family of microprocessors. In an alternative embodiment, processor 663 is specially designed hardware for controlling the operations of device 610. In a specific embodiment, memory 661 (such as non-volatile RAM and/or ROM) also forms part of CPU 662. However, there are many different ways in which memory could be coupled to the system.

CPU 662 can be configured to execute instructions provided by one or more software modules, for example, to perform operations including: displaying a first set of search results, the first set of search results comprising a first plurality of media content items arranged in an order of descending relevance based on search frequency, receiving a first character input from a user of a user device, the first character input defining a first character in a search query, updating the first set of search results to a second set of search results based on the first character input, the second set of search results comprising at least one media content item not included in the first set of search results that is available for consumption by the user, and wherein the second set of search results are displayed in an order of decreasing relevance. In some aspects, CPU 662 may further be configured to execute operations for displaying a contextual tag adjacent to at least one of the media content items, the contextual tag providing information regarding a consumption of the at least one of the media content items by one or more online friends of the user. In some aspects, displaying the plurality of media content items to the user in an order of decreasing relevance, further includes arranging each of the plurality of media content items in an order of relevance based on an associated search frequency. In some aspects, displaying the plurality of media content items to the user in an order of decreasing relevance, further includes arranging each of the plurality of media content items in an order of relevance based on a purchase history of the one or more online friends of the user.

Interfaces 668 are typically provided as interface cards (sometimes referred to as "line cards"). Generally, they control the sending and receiving of data packets over the network and sometimes support other peripherals used with the network device 610. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 662 to efficiently perform routing computations, network diagnostics, security functions, etc.

Although the system shown in FIG. 5 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the configuration of network device 610, it may employ one or more memories or memory modules (including memory 661) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A computer-implemented method for tagging custom search results in an online platform, the method comprising:
   providing a display of a default set of selection options to a user device, the default set of selection options comprising a first plurality of media content items corresponding to search frequency on the online platform;
   receiving a first character input from a user of the user device, the first character input defining a first character in a single search query string;
   updating the display based on a search for the first character, the updated display including a set of search results comprising at least one media content item not included in the default set of selection options that is available for consumption by the user, and wherein the at least one media content item is included in the set of search results based on one or more characteristics in common with media content items engaged by the user or one or more online friends within a social graph of the user;
   further updating the display as each of one or more subsequent characters is input after the first character, wherein input of each of the subsequent characters updates a current set of characters in the single search query string, and wherein each update to the display corresponds to the current set of characters in the single search query string; and
   providing a contextual tag within the updated display, the contextual tag corresponding to the at least one media content item in the set of search results, and indicating a consumption level of the at least one media content item by one or more of the online friends within the social graph of the user.

2. The computer-implemented method of claim 1, further comprising arranging the search results in an order of decreasing relevance based on an associated interaction frequency by the online friends.

3. The computer-implemented method of claim 1, further comprising arranging the search results in an order of decreasing relevance based on a purchase history of the online friends.

4. The computer-implemented method of claim 1, further comprising:
   selecting a search term suggestion based on the first character input; and
   displaying the search term suggestion to the user, wherein the search is performed based on user interaction with the displayed search term.

5. The computer-implemented method of claim 1, further comprising:
   receiving a selection from the user device that indicates the at least one media content item from among the set of search results; and
   displaying one or more other media content items related to the selected media content item, wherein the related media content items include at least one version upgrade item.

6. The method of claim 1, wherein the contextual tag indicates the consumption level as a number of the online friends within the social graph of the user that have interacted with the corresponding media content item.

7. The method of claim 1, further comprising accessing the social graph of the user via one or more social networks, wherein performing the search includes prioritizing one or more media items associated with higher levels of engagement among the online friends.

8. The method of claim 1, wherein the contextual tag further augments the updated display based on metadata associated with the corresponding media content item.

9. The method of claim 1, further comprising receiving one or more additional character inputs, and updating the display with each additional character input, wherein each updated display includes a different set of search results.

10. The method of claim 1, further comprising identifying each of the set of search results based on a respective measure of relevance to the first character, and ranking each of the identified search results based on relevance to the social graph of the user.

11. The method of claim 10, wherein ranking each of the identified search results is further based on relevance to a purchase history of the user.

12. The method of claim 1, wherein the single search query string corresponds to one search term.

13. The method of claim 1, wherein the current set of characters is continuous within the single search query string.

14. A non-transitory computer-readable storage medium, having embodied thereon instructions executable by a processor to perform a method for tagging custom search results in an online platform, the method comprising:
   providing a display of a default set of selection options to a user device, the default set of selection options comprising a first plurality of media content items corresponding to search frequency on the online platform;
   receiving a first character input from a user of the user device, the first character input defining a first character in a single search query string;
   updating the display based on a search for the first character, the updated display including a set of search results comprising at least one media content item not included in the default set of selection options that is available for consumption by the user, and wherein the at least one media content item is included in the search results based on one or more characteristics in common with media content items engaged by the user or one or more online friends within a social graph of the user;
   further updating the display as each of one or more subsequent characters is input after the first character, wherein input of each of the subsequent characters updates a current set of characters in the single search query string, and wherein each update to the display corresponds to the current set of characters in the single search query string; and
   providing a contextual tag within the updated display, the contextual tag corresponding to the at least one media content item in the set of search results, and indicating a consumption level of the at least one media content item by one or more of the online friends within the social graph of the user.

15. The non-transitory computer-readable storage medium of claim 14, further comprising instructions executable to arrange the search results in an order of decreasing relevance based on an associated interaction frequency by the online friends.

16. The non-transitory computer-readable storage medium of claim 14, further comprising instructions executable to arrange the search results in an order of decreasing relevance based on a purchase history of the online friends.

17. The non-transitory computer-readable storage medium of claim 14, further comprising instructions executable to:

select a search term suggestion based on the first character input; and display the search term suggestion to the user, wherein the search is performed based on user interaction with the displayed search term.

18. The non-transitory computer-readable storage medium of claim 14, further comprising instructions executable to:

receive a selection from the user device that indicates the at least one media content item from among the set of search results; and display one or more other media content items related to the selected content item, and wherein the related media content items include at least one version upgrade item.

19. A system for tagging custom search results in an online platform, the system comprising:

one or more processors;

a network interface coupled to the processors, the network interface communicating with a user device over a communication network; and a computer-readable storage medium coupled to the processors, the computer-readable medium comprising instructions stored therein and executable by the processors to:

provide a display of a default set of selection options to the user device, the default set of selection options comprising a first plurality of media content items corresponding to search frequency on the platform;

receive a first character input from a user of the user device, the first character input defining a first character in a single search query string;

update the display based on a search for the first character, the updated display including a set of search results comprising at least one media content item not included in the default set of selection options that is available for consumption by the user, and wherein the at least one media content item is included in the search results based on one or more characteristics in common with media content items engaged by the user or one or more online friends within a social graph of the user;

further update the display as each of one or more subsequent characters is input after the first character, wherein input of each of the subsequent characters updates a current set of characters in the single search query string, and wherein each update to the display corresponds to the current set of characters in the single search query string; and provide a contextual tag within the updated display, the contextual tag corresponding to the at least one media content item in the set of search results, and indicating a consumption level of the at least one media content item by one or more of the online friends within the social graph of the user.

20. The system of claim 19, wherein the processors execute further instructions to arrange the search results in an order of decreasing relevance based on an associated interaction frequency by the online friends.

21. The system of claim 19, wherein the processors execute further instructions to arrange the search results in an order of decreasing relevance based on a purchase history of the online friends.

22. The system of claim 19, wherein the processors execute further instructions to:

select a search term suggestion based on the first character input; and display the search term suggestion to the user, wherein the search is performed based on user interaction with the displayed search term.

* * * * *